(12) United States Patent
Sapozhnikov et al.

(10) Patent No.: US 9,508,366 B2
(45) Date of Patent: Nov. 29, 2016

(54) READER STRUCTURE

(71) Applicant: Seagate Technology LLC, Cupertino, CA (US)

(72) Inventors: Victor Boris Sapozhnikov, Minnetonka, MN (US); Mohammed Sharia Ullah Patwari, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/975,053

(22) Filed: Aug. 23, 2013

(65) Prior Publication Data
US 2015/0055251 A1     Feb. 26, 2015

(51) Int. Cl.
*G11B 5/39*     (2006.01)

(52) U.S. Cl.
CPC ........... *G11B 5/3932* (2013.01); *G11B 5/3909* (2013.01); *G11B 5/3912* (2013.01); *Y10T 428/1121* (2015.01)

(58) Field of Classification Search
CPC . G11B 5/3932; G11B 5/3903; G11B 5/3909; G11B 2005/3996; G11B 5/3967; G11B 5/3163; G11B 2005/0024
USPC .................................................. 360/324.12
See application file for complete search history.

(56) References Cited

U.S. PATENT DOCUMENTS

| | | | | |
|---|---|---|---|---|
| 4,956,736 A * | 9/1990 | Smith | ........................ | 360/327 |
| 5,379,172 A * | 1/1995 | Liao | ........................ | 360/125.5 |
| 5,483,403 A * | 1/1996 | Voegeli | ........................ | 360/321 |
| 6,256,177 B1 * | 7/2001 | Urai et al. | ............... | 360/324.12 |
| 6,500,570 B2 * | 12/2002 | Hasegawa et al. | ........ | 428/811.2 |
| 6,765,770 B2 * | 7/2004 | Dee | ........................ | 360/324.12 |
| 6,809,900 B2 * | 10/2004 | Covington | ............... | 360/125.01 |
| 6,965,494 B2 * | 11/2005 | Campbell et al. | ........ | 360/125.04 |
| 7,330,339 B2 * | 2/2008 | Gill | ........................ | 360/324.11 |
| 7,460,343 B2 * | 12/2008 | Carey et al. | ............. | 360/324.12 |
| 8,023,230 B2 * | 9/2011 | Machita et al. | ............. | 360/313 |
| 8,400,738 B2 | 3/2013 | Covington et al. | | |
| 8,405,931 B2 * | 3/2013 | Kief et al. | ................ | 360/125.1 |
| 8,675,315 B2 * | 3/2014 | Scholz et al. | ............. | 360/319 |
| 8,742,518 B2 * | 6/2014 | Wang et al. | ................. | 257/421 |
| 8,755,154 B2 * | 6/2014 | Dimitrov et al. | .......... | 360/324.1 |
| 2006/0221510 A1 * | 10/2006 | Parkin | ........................ | 360/324.2 |

FOREIGN PATENT DOCUMENTS

JP     2012-230752 A     11/2012

OTHER PUBLICATIONS

Oates et al., "High field ferromagnetic resonance measurements of the anisotropy field of longitudinal recording thin-film media", Journal of Applied Physics, vol. 91, No. 3, Feb. 1, 2002, pp. 1417-1422.

\* cited by examiner

*Primary Examiner* — Mark Blouin
(74) *Attorney, Agent, or Firm* — Holzer Patel Drennan

(57) ABSTRACT

An apparatus disclosed herein includes a sensor with a free layer having cross-track easy axis anisotropy.

20 Claims, 9 Drawing Sheets

READER STRUCTURE

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

Implementations described and claimed herein provide a reader structure including a sensor wherein at least part of a free layer has cross-track easy axis anisotropy. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

Figure 1:
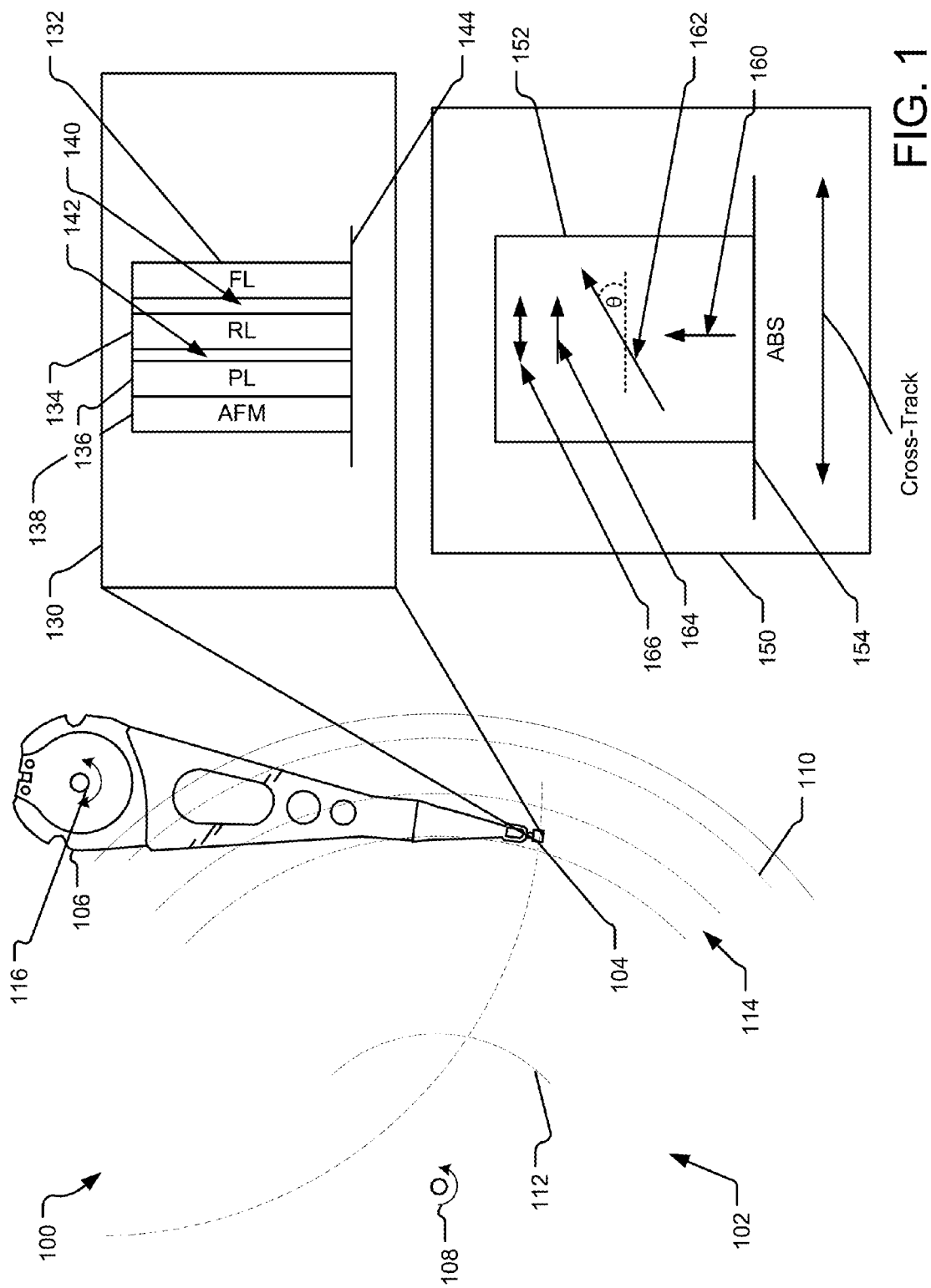
FIG. 1 illustrates a perspective view of an example recording device using a reader disclosed herein.

Magnetic disk drives typically include a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Magnetoresistive (MR) read sensors, commonly referred to as MR sensors, are used in all high capacity disk drives. An MR sensor detects a magnetic field through a change in its resistance as a function of the strength and direction of the magnetic flux being sensed by an MR layer. The standard type of MR sensor in disk drives manufactured today employs the tunneling magnetoresistive (TMR) effect, such that the resistance varies as a function of the spin-dependent quantum-mechanical tunneling transmission of the conduction electrons between two or more ferromagnetic layers separated by an insulating, non-magnetic tunneling barrier. The resistance of these sensors depends on the relative orientation of the magnetization of the different magnetic layers.

An MR read sensor may include a number of magnetic layers, such as an antiferromagnetic (AFM) layer, a synthetic antiferromagnetic (SAF) layer, and a free layer (FL). The SAF and the FL may be separated by a tunneling barrier and the SAF layer may include a pinned layer (PL) and a reference layer (RL) separated by a Ruthenium (Ru) layer. The PL is pinned such that the moment of the magnetization of the PL is orthogonal to an air-bearing surface (ABS) of the read sensor. Similarly, the RL is pinned such that the moment of the magnetization of the RL is also orthogonal to the ABS. However, the direction of the magnetization of the RL and the PL are opposite, or 180 degrees apart from each other.

On the other hand, the FL is biased such that the moment of magnetization of the FL is at perpendicular from the pinning of the PL and RL. In other words the direction of the magnetization of the FL is in a direction parallel to the surface of the ABS. Specifically, the direction of the magnetization of the FL is generally in a direction parallel to the surface of the ABS and in the cross-track direction and in a direction perpendicular to the movement of the read sensor over the magnetized media. During the operation of the read sensor, the sensor is exposed to a range of magnetic fields from the recording medium, from positive to negative fields. As the field changes, the direction of the magnetic moments of the various magnetic layers of the stack, specifically of the FL, rotates, thus creating a signal.

As the read sensor moves on the surface of the magnetic recording media, the magnetization of the FL changes due to transitions in the magnetic recording media track. As the read sensor passes over these transitions, the magnetic fields of the transitions modulate the resistance of the read sensor.

The change in the resistance of the read sensor is detected by passing a sense current through the read sensor and then measuring the change in voltage across the read sensor. The resulting resistance-based voltage signal is used to recover data encoded on the track of the disk.

As the field from the magnetic media increases, the voltage signal increases, and vice-versa. However, the relation between the magnetic field amplitude applied to the senor and the voltage signal amplitude generate by the sensor is not linear. In other words, if the magnetic field amplitude were plotted against the voltage signal amplitude, at least in some portions of the graph (typically at high magnetic field signal amplitudes) the relation between the magnetic field amplitude and the voltage signal amplitude becomes non-linear. Such non-linear relation may lead to increase in signal distortion and in asymmetry sigma, resulting in decrease in the signal to noise ratio (SNR). Furthermore, such non-linearity also limits the voltage signal amplitude range that can be used for reading data from media.

An implementation of a sensor disclosed herein reduces the non-linearity of the reader by partially replacing the magnetostatic bias of a free layer (FL) of the sensor coming from permanent magnets (PMs) (or side shields) with a cross-track anisotropy field in the FL. The cross-track anisotropy may be magnetocrystalline anisotropy that is introduced by, for example, oblique deposition of at least part of the FL. Alternatively, the cross-track anisotropy may be introduced in the free layer utilizing magnetostriction. Yet alternatively, the cross-track anisotropy may be introduced by creating anisotropic roughness on a sensor layer before depositing the FL.

FIG. 1 illustrates an example block diagram 100 illustrating an example read sensor structure implemented on an end of an actuator assembly. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of regularly spaced patterned bits.

Information may be written to and read from the patterned bits on the data tracks 114 through the use of the actuator assembly 106, which rotates during a data track 114 seek operation about an actuator axis of rotation 116 positioned adjacent the disc 102. The transducer head 104 mounted on the actuator assembly 106 at an end distal from the actuator axis of rotation 116 flies in close proximity above the surface of the disc 102 during disc operation. The transducer head 104 includes recording head including a read sensor for reading data from the track 114 and a write pole for writing data to the track 114.

To read data from the magnetic disc 102, transitions on the track 114 of the disc 102 create magnetic fields. As the read sensor passes over the transitions, the magnetic fields of the transitions modulate the resistance of the read sensor. The change in the resistance of the read sensor is detected by passing a sense current through the read sensor and then measuring the change in voltage across the read sensor. The resulting resistance-based signal is used to recover data encoded on the track of the disc 102.

FIG. 1 also illustrates an expanded view of a partial cross-sectional configuration of a sensor stack 130 of a read sensor wherein the read sensor may be located on the transducer head 104. The sensor stack 130 is shown to include an FL 132 located at the top (in a down-track direction) of the sensor stack 130. The FL 132 is separated from an RL 134 by a tunneling barrier 140. The RL 134 is located on top of a PL 136 and separated from the PL 136 by a Ruthenium (Ru) layer 142. The bottom of the sensor stack 130 includes an AFM layer 138. The combination of the RL 134, the PL 136 and the Ru layer 142 is also referred to as the SAF structure. Various layers of the sensor stack 130 are disclosed with respect to an ABS layer 144 of the sensor stack 130.

The FL 132 is also illustrated via a graphical representation 150 with respect to an ABS 154. Specifically, the representation 150 discloses a cross-track view of the FL 152. As the transducer head 104 moves over the media, the FL 152 is influenced by a number of different magnetic fields and the torques resulting therefrom. For example, as the FL 152 comes in vicinity of a recorded bit of information on the magnetic media, a media field 160 affects the FL 152. For magnetic media with perpendicular recording, the media field 160 is orthogonal to the ABS. Furthermore, the FL 152 is located between permanent magnets (PMs) or side shields (not shown) in the cross-track direction. Such PMs or side shields provide a PM bias 164. The PM bias 164 is generally unidirectional and perpendicular to the ABS.

The magnetic moment of the FL 152 is parallel to the ABS, but free to rotate in response to external magnetic fields, such as the media field 160. In the presence of the media field 160, the FL magnetic moment 162 is canted upwards due to torque from the media field 160. In other words, the media field 160 provides a media torque $T_m$ that causes the FL magnetic moment 162 to tilt towards the direction orthogonal to the ABS. On the other hand, the PM bias 164 generates a PM bias torque $T_{PM}$ that causes the FL moment 162 to remain parallel the ABS.

In an implementation of the read sensor disclosed herein, the FL 152 also includes cross-track anisotropy. Such cross-track anisotropy may be introduced in the FL 152 by, for example, oblique disposition of at least part of the FL, magnetostriction, etc. The cross-track anisotropy of the FL generates across-track anisotropy field 166. The cross-track anisotropy field 166 is uniaxial (bidirectional) and parallel to the ABS. The cross-track anisotropy field 166 also provides a torque $T_k$ to the FL magnetic moment 162.

The value of various torques affecting the FL magnetic moment 162 as a function of an angle θ between the FL magnetic moment 162 and a direction parallel to the ABS can be provided by the equations 1-3 below:

$$T_m = MH_m \cos(\theta) \qquad \text{eq. 1}$$

$$T_{PM} = -MH_{PM} \sin(\theta) \qquad \text{eq. 2}$$

$$T_k = -MH_k \sin(\theta)\cos(\theta) = -0.5 MHk \sin(2\theta) \qquad \text{eq. 3}$$

The proposed design with cross-track anisotropy takes advantage of the differences in the angular dependence of the torques $T_m$ and $T_{PM}$ from the unidirectional fields $H_m$ and $H_{PM}$ and the torque $T_k$ from the uniaxial field $H_k$. Specifically, at low angles θ, the torque $T_k$ from the uniaxial field $H_k$ grows faster than the torque $T_{PM}$ from the unidirectional field $H_{PM}$. Therefore, at low angles θ, the uniaxial torque $T_k$ suppresses the amplitude generated by the FL magnetic moment 162 more than the amplitude suppression by the bidirectional torque $T_{PM}$. On the other hand, at higher angles θ, the uniaxial torque $T_k$ suppresses the amplitude generated by the FL magnetic moment 162 less than the amplitude suppression by the bidirectional torque $T_{PM}$. Thus, the combined effect of the introduction of the cross-track anisotropy in the FL 152 is to make the transfer curve of the amplitude of output signal V as a function of media field $H_{media}$ to be more linear.

The transfer curve between the amplitude of output signal V and the media field $H_{media}$ can be obtained by equating the sum of the torques $T_k$, $T_m$, and $T_{PM}$ to zero and including the expression for the transfer curve $V=V_{max} \sin(\theta)$, as follows:

$$H_{media} = \frac{v}{v_{max}} + \left[ \frac{H_{FM}}{\sqrt{1-v^2/v^2 max}} + H_k \right] \quad \text{eq. 4}$$

The addition of the uniaxial field $H_k$ resulting from the cross-track anisotropy in the FL results in reduced non-linearity in the transfer curve between the field $H_{media}$ and the signal amplitude V. In other words, for a given signal amplitude V the transfer curve has higher linearity. Alternatively, for a given linearity that may be acceptable for the use of sensor, higher signal amplitude V may be used. Thus, a higher range of signal amplitude V becomes available for use.

Figure 2:
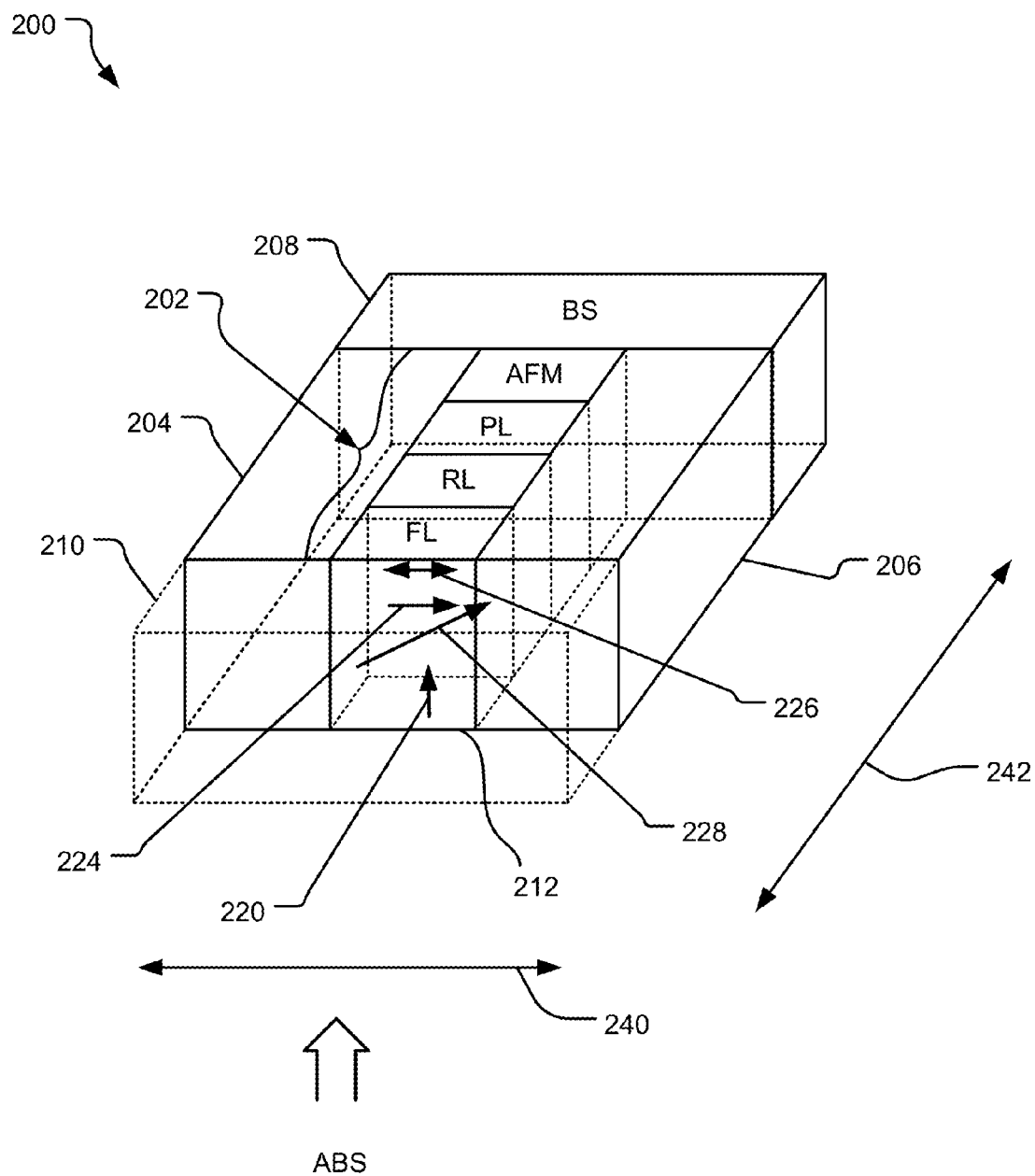
FIG. 2 illustrates a schematic three-dimensional view of an example reader structure disclosed herein.

FIG. 2 illustrates a schematic three-dimensional block diagram of an example implementation of the reader 200 disclosed herein. The reader 200 includes a sensor stack 202 between a base shield 208 and a top shield 210 in down-track direction 242. The base shield 208 and the top shield 210 may be made of a magnetic material, such as NiFe, NiFeCu, NiCoFe, etc. The sensor stack 202 is surrounded by PMs 204 and 206 in cross-track direction 240. The sensor stack 202 includes various layers, including a FL 212, a RL, a PL, and an AFM layer.

The magnetic moment 228 of the FL 212 is parallel to the ABS, but free to rotate in response to external magnetic fields, such as a media field 220. In the presence of the media field 220, the FL magnetic moment 228 is canted upwards due to torque from the media field 220. In other words, the media field 220 provides a media torque that causes the FL magnetic moment 228 to tilt towards the direction orthogonal to the ABS. On the other hand, a PM bias 224 (generated by the PMs 204 and 206) generates a PM bias torque that causes the FL magnetic moment 228 to remain parallel the ABS.

In an implementation of the read sensor disclosed herein, the FL 212 also includes cross-track anisotropy. Such cross-track anisotropy may be introduced in the FL 212 by, for example, oblique deposition of at least part of the FL, magnetostriction, etc. The cross-track anisotropy of the FL 212 generates across-track anisotropy field 226. Such cross-track anisotropy field 226 is uniaxial (bidirectional) and parallel to the ABS and it provides a torque to the FL magnetic moment 228. The addition of the uniaxial field resulting from the cross-track anisotropy in the FL 212 results in increased linearity in the transfer curve between the media field 220 and the amplitude of a signal generated by the sensor 200.

Figure 3:
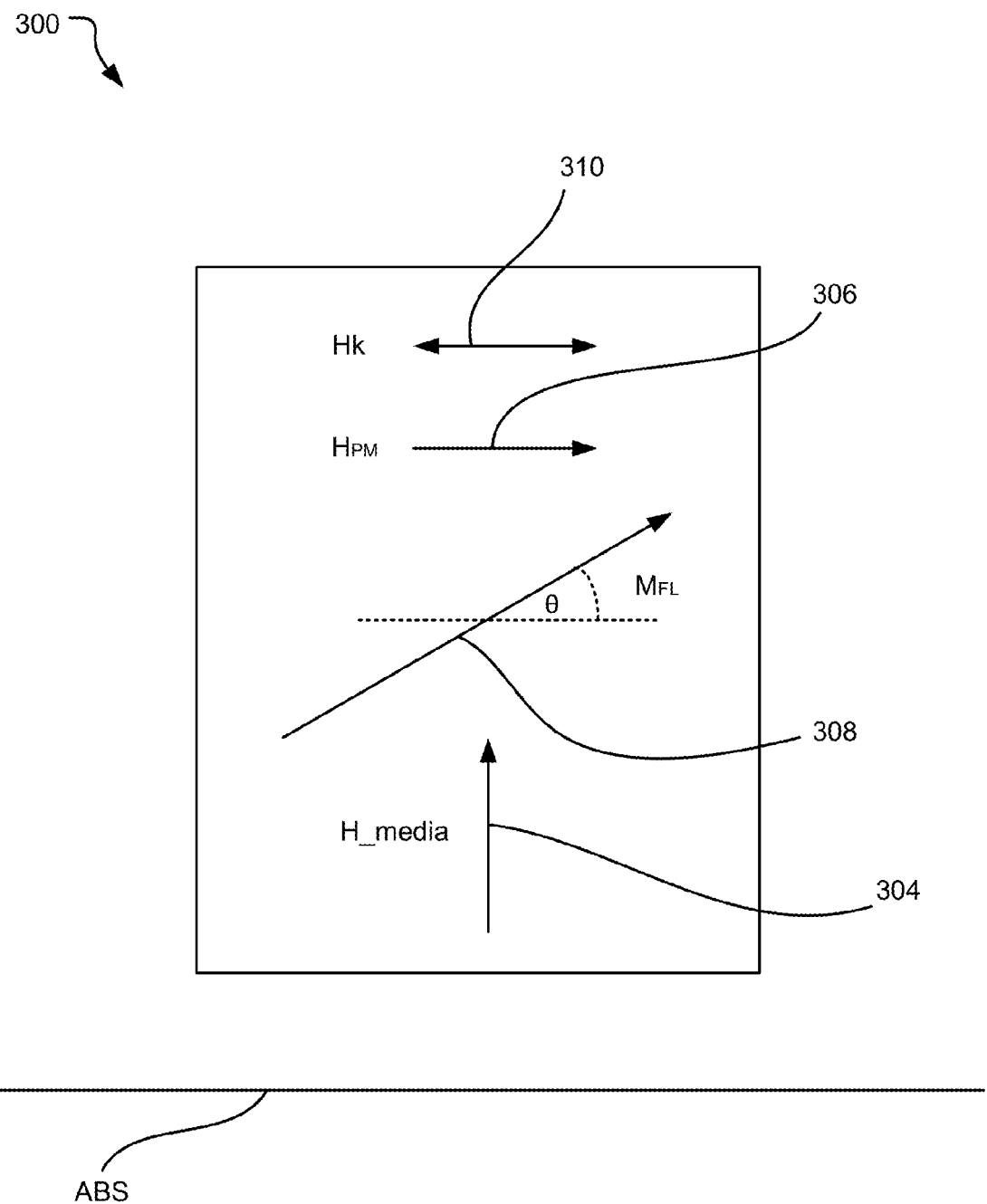
FIG. 3 illustrates a schematic side view of an example FL disclosed herein.

FIG. 3 illustrates a schematic side view of an example FL 300 disclosed herein. As discussed above, the magnetic moment 308 of the FL 300 is affected by a media field 304, a uniaxial PM bias 306, and bidirectional anisotropy field 310. Specifically, the torque generated by the media field 304 causes the magnetic moment 308 to be canted towards a direction orthogonal to the ABS. Thus, the effect of the torque generated by the media field 304 causes the magnetic moment 308 is to reduce the angle θ. On the other hand, the effect of the torque generated by the uniaxial PM bias 306 on the magnetic moment 308 is to increase the angle θ.

In the absence of the bidirectional anisotropy field 310, the effect of the torque generated by the PM bias 306 on the magnetic moment 308 is such that the transfer curve between the media field 304 and an amplitude of the signal generated by the sensor 300 is non-linear. The introduction of the bidirectional anisotropy field 310 and a corresponding reduction of the PM field reduces the impact of the torque generated by the PM bias 306 on the magnetic moment 308 at low values of the signal generated by the sensor 300 and therefore, the non-linearity in the relation between the media field 304 and an amplitude of the signal generated by the sensor 300 is reduced at low amplitudes. Such reduction in non-linearity allows use of higher range of signal amplitudes, thus increasing the signal to noise ratio (SNR) of the sensor 300.

Figure 4:
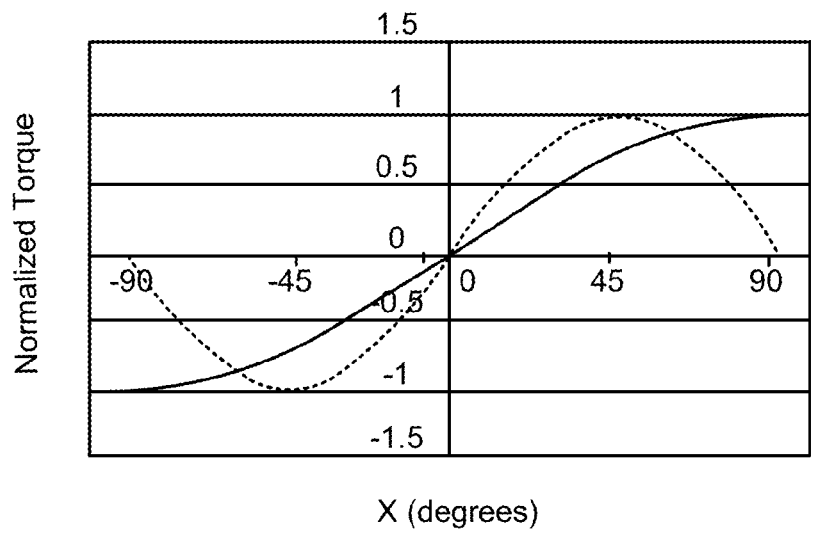
FIG. 4 illustrates an example graph of a relation between the torque exerted by various fields and an angle of the FL magnetic moment compared to an angle parallel to the ABS for a sensor disclosed herein.

FIG. 4 illustrates a graph 400 of a relation between the torque (normalized between 0 and 1) exerted by various fields and an angle of the FL magnetic moment compared to an angle parallel to the ABS for an sensor disclosed herein. A line 402 illustrates PM bias torque $T_{PM}$ (between 0 and 1) due to a unidirectional PM bias field applied to the FL. The PM bias torque $T_{PM}$ is in the form of a normal sinusoidal curve. On the other hand a line 404 illustrates anisotropy field torque $T_k$ due to the bi-directional anisotropy field in the FL. The anisotropy field torque $T_k$ can be given by an equation of sinusoidal equation for 2θ.

As illustrated, the transfer curve for the anisotropy field torque $T_k$ is more linear than the curve for the PM bias torque $T_{PM}$. This effect of differences in the non-linearity is especially pronounced at lower angles, below 45 degrees. Thus, while the effect of the PM bias torque $T_{PM}$ at lower angles is to generate non-linearity in the signal generated by the sensor, the addition of the anisotropy field torque $T_k$ reduces such non-linearity. As a result, a wider range of the output signal amplitude can be used for reading data from media and such increase in the output signal amplitude increases the SNR of the sensor.

Figure 5:
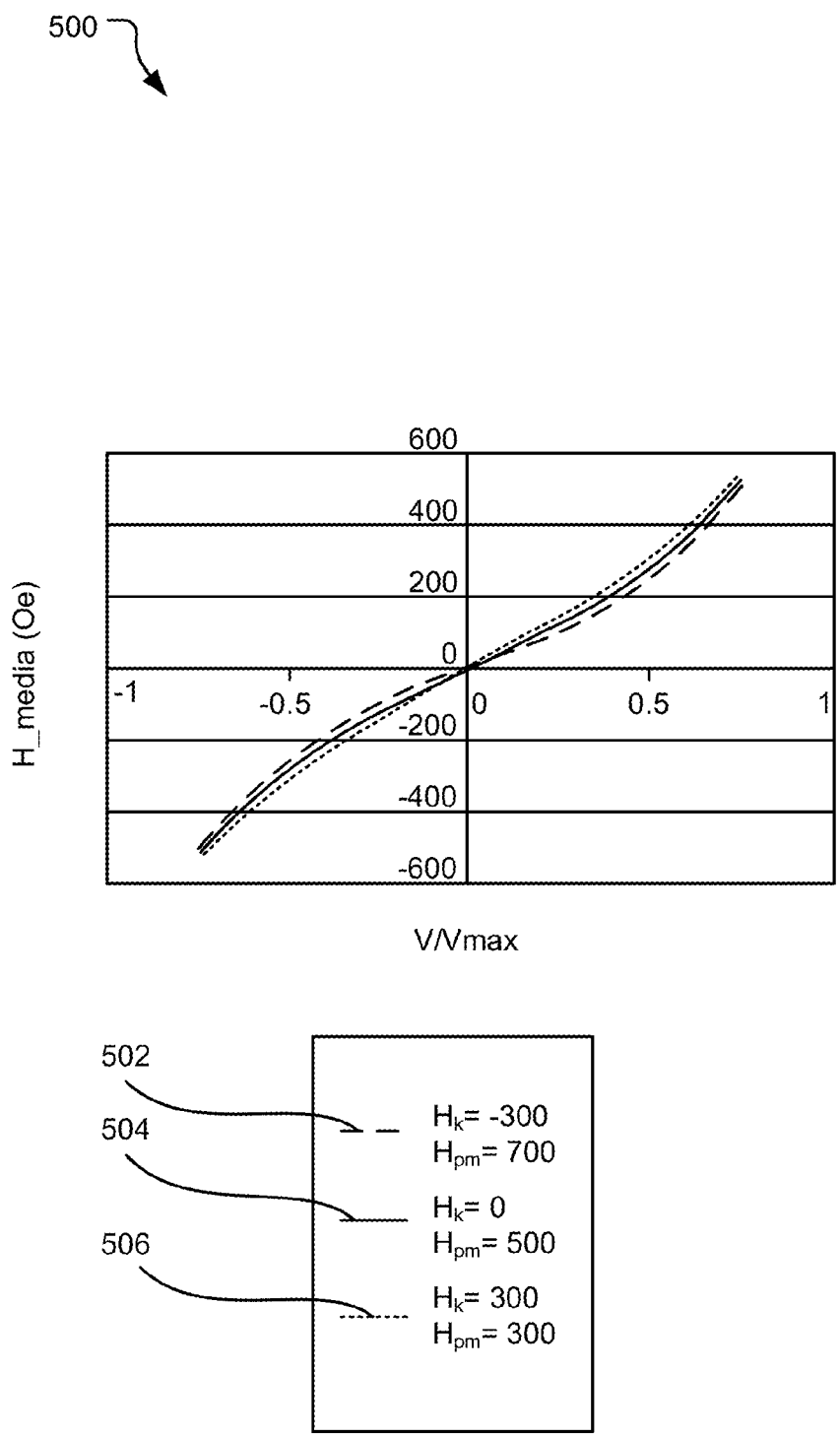
FIG. 5 illustrates comparative graphs of a relation between the field from media and the signal amplitude generated by the sensor.

FIG. 5 illustrates comparative graphs 500 of a relation between the field from media and the signal amplitude generated by the sensor. Specifically, a line 502 illustrates a transfer curve in presence of negative cross-track anisotropy field $H_k$, a line 504 illustrates a transfer curve in absence of cross-track anisotropy field $H_k$, and a line 506 illustrates a transfer curve in presence of positive cross-track anisotropy field $H_k$. Furthermore, the amplitude of the PM bias field $H_{PM}$ is reduced from line 502 (700 Oe), to line 504 (500 Oe) to line 502 (300 Oe). As seen from the graphs 500, addition of positive anisotropy field $H_k$ (line 506) and reduction of the PM bias field $H_{PM}$ improves the linearity of the transfer curve compared to the transfer curves without anisotropy field $H_k$ (line 504) and in the presence of negative anisotropy field $H_k$ (line 502).

Figure 6:
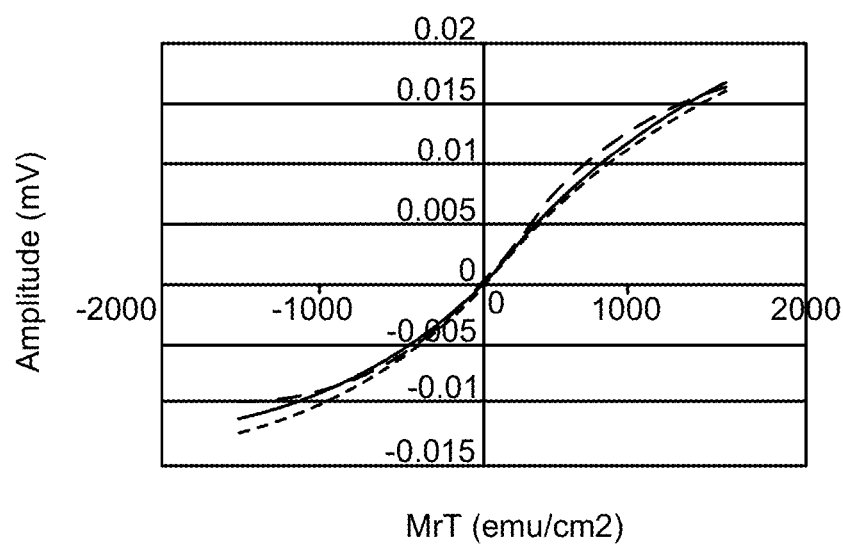
FIG. 6 illustrates alternative comparative graphs of a relation between magnetic moment generated by the field from media and the signal amplitude generated by the sensor.
Figure 6:
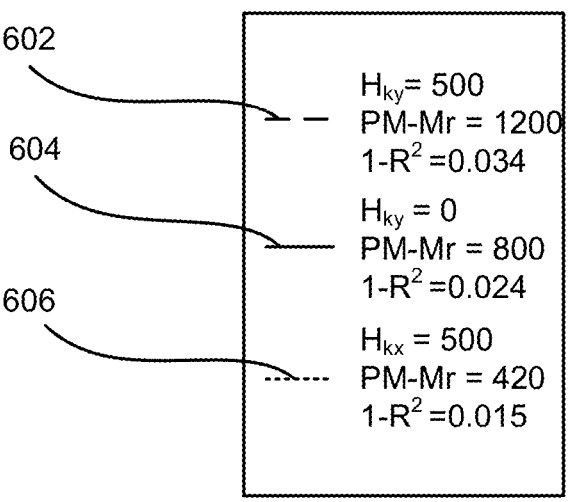

FIG. 6 illustrates alternative comparative graphs 600 of a relation between magnetic moment ($M_rT$) generated by the field from media and the signal amplitude generated by the sensor. Specifically, each of the graphs 600 illustrate results of micro-magnetic modeling, which show that applying cross-track anisotropy field $H_k$ makes the transfer curves more linear. For example, the line 602 illustrates the transfer curve in the presence of positive easy axis anisotropy field $H_k$ perpendicular to the ABS (similar to negative cross-track anisotropy field $H_k$), the line 604 illustrates the transfer curve in absence of cross-track anisotropy field $H_k$, and the line 606 represents the transfer curve in presence of positive cross-track anisotropy field $H_k$. Furthermore, the PM bias strength controlled by PM magnetic moment (PM-Mr) is reduced from 1200 Oe for line 602, to 800 Oe for line 604, to 500 Oe for line 606 to preserve amplitude between the three cases.

FIG. 6 also provides the closeness of the approximation of the transfer curves 602, 604, and 606 to a straight line (linear relation) using the $1-R^2$, the measure of non-linearity for each of the curves. As shown, the $1-R^2$ decreases from 0.034 to 0.015 as the cross-track anisotropy field $H_k$ increases from −500 Oe to 500 Oe. Thus, the sensor design with cross-track anisotropy field $H_k$ has better linearity than the implementations without (or with negative) cross-track anisotropy field $H_k$. This allows for reducing the PM field bias to allow for higher signal amplitude, while keeping the nonlinearity and the asymmetry sigma within the permissible limits, thus increasing the SNR of the sensor.

Figure 7:
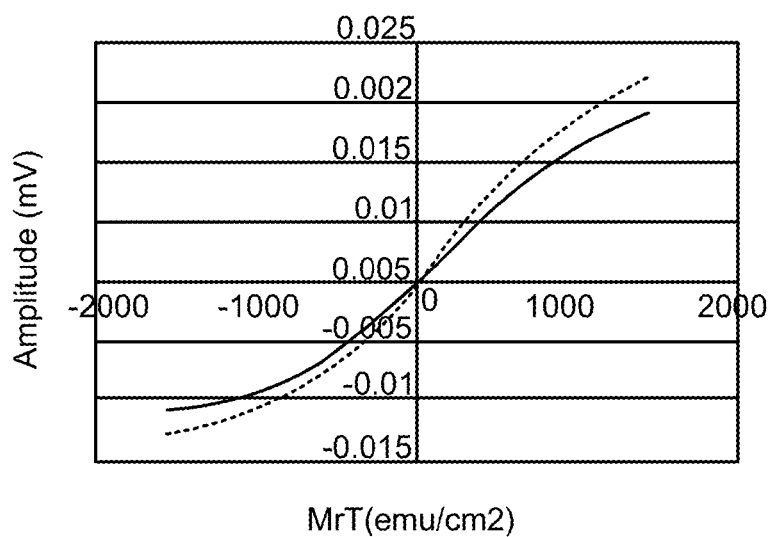
FIG. 7 illustrates alternative comparative graphs of a relation between magnetic moment generated by the field from media and the signal amplitude generated by the sensor.
Figure 7:
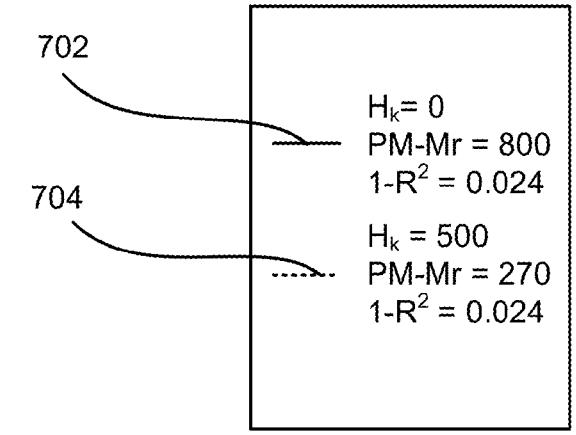

FIG. 7 illustrates alternative comparative graphs 700 of a relation between magnetic moment ($M_rT$) generated by the field from media and the signal amplitude generated by the sensor. Specifically, the lines 702 and 704 illustrate two implementations where the non-linearity (as represented by $1-R^2$) is kept the same. The graphs 700 illustrate that for the same non-linearity, approximately twenty percent (20%) amplitude gain can be achieved (as represented by the difference in mV for given MrT) by introducing cross-track anisotropy field of 500 Oe and reducing the PM bias magnetic moment PM-Mr from 800 Oe to 270 Oe. Thus, higher SNR can be achieved for any given media field.

Figure 8:
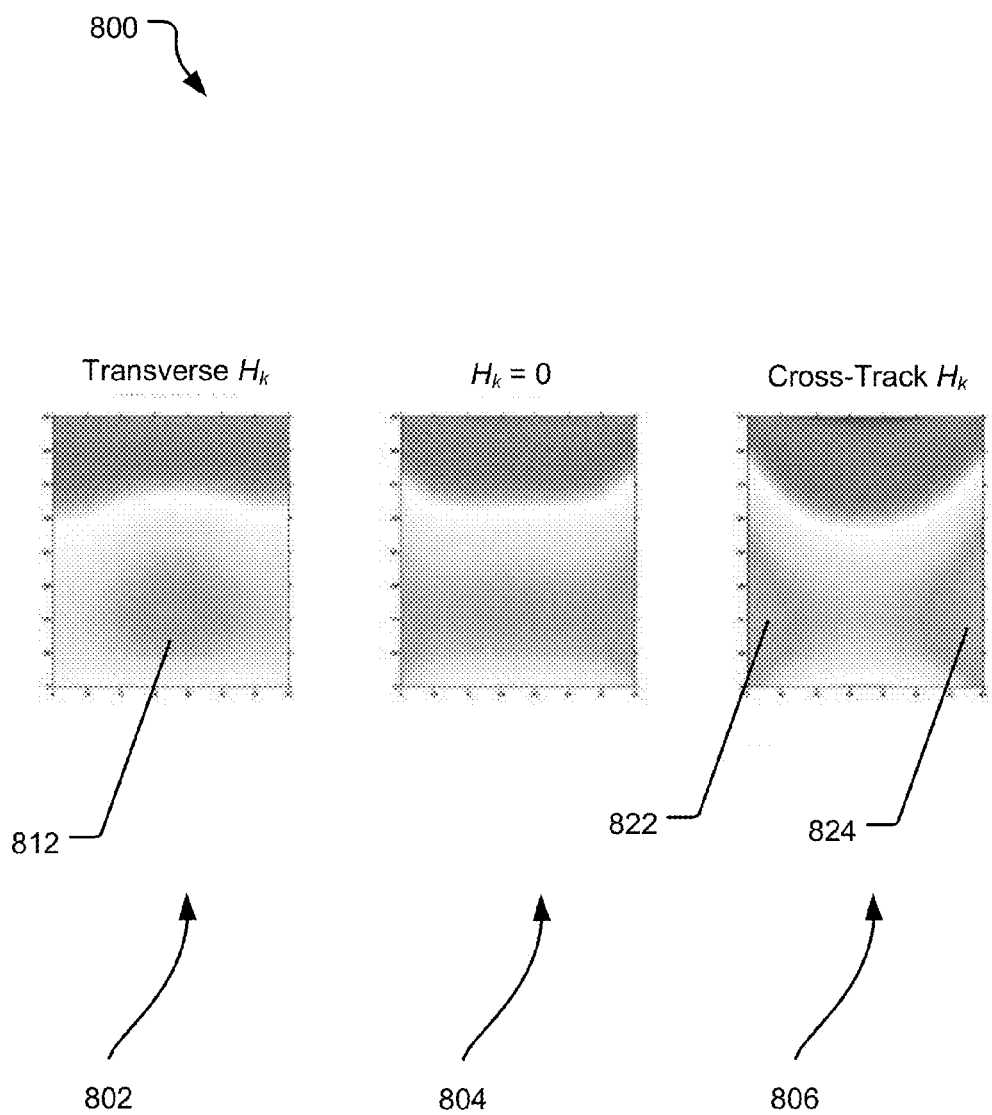
FIG. 8 illustrates example maps of signal distribution over the sensor area for the sensor disclosed herein.

FIG. 8 illustrates example maps 800 of signal distribution over the sensor area for the sensor disclosed herein. Specifically, the distribution 802 illustrate that in the presence of transverse (perpendicular to the ABS) anisotropy field $H_k$ (negative cross-track anisotropy field), more signal is generated at the center (812) of the FL. The distribution 804 illustrate that in the absence of anisotropy field $H_k$, the signal generated in the FL is distributed substantially uniformly in cross-track direction. On the other hand, the distribution 806 illustrates that in the presence of positive cross-track anisotropy field $H_k$, more signal is generated at the edges (822, 824) of the FL, or near the cross-track junction of the FL with the PMs.

Figure 9:
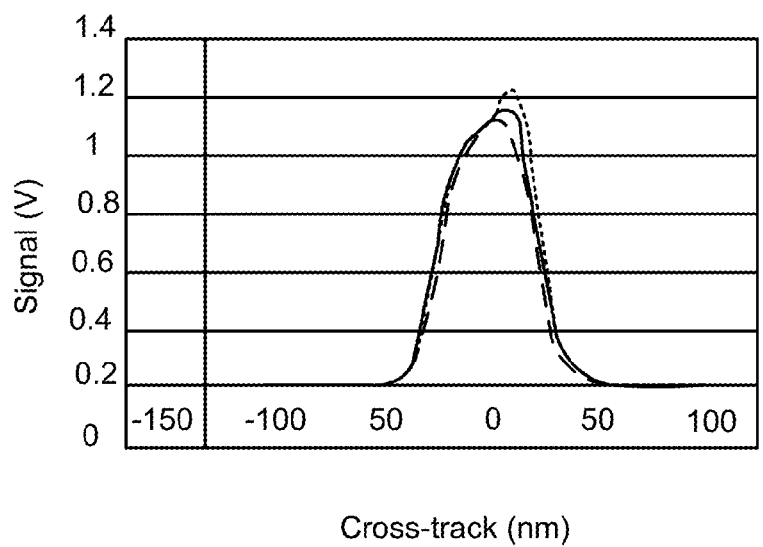
FIG. 9 illustrates a micro-track readback signal distribution over sensor in a cross-track direction.
Figure 9:
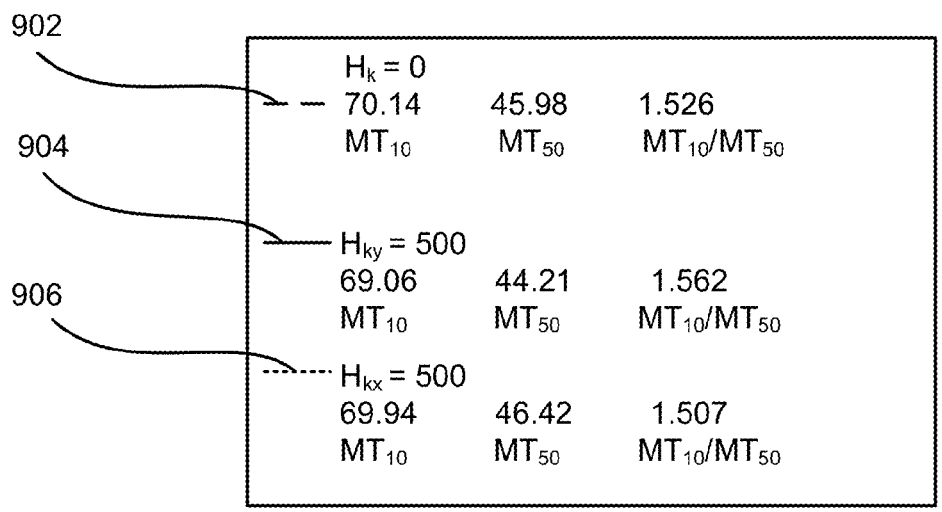

FIG. 9 illustrates a graph 900 of micro-track readback signal profile in a cross-track direction. In the illustrated graph, the distribution of the cross-track anisotropy field in the FL is substantially uniform along a cross-track direction. Specifically, each of the lines 902 (no cross-track anisotropy field $H_k$), 904 (negative cross-track anisotropy field $H_k$), and 906 (positive cross-track anisotropy field $H_k$) illustrate the signal amplitude as a function of cross-track distance (nm) between the microtrack and the reader center. Graphs 900 also illustrate the $MT_{50}$, the $MT_{10}$, and the ratio of $MT_{10}/MT_{50}$ for each of the various implementations of sensor. As shown, the implementation with positive cross-track anisotropy field $H_k$, provides substantially lower $MT_{10}/MT_{50}$ of 1.507 compared to the other implementations, resulting in a reader with higher kBPI (kilo bits/inch) capability.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. An apparatus comprising:
a sensor stack of a read sensor including a free layer (FL) that has cross-track, uniaxial and bidirectional, easy axis anisotropy.

2. The apparatus of claim 1 wherein the cross-track anisotropy generates a cross-track anisotropy field that partially replaces magnetostatic bias of the FL from at least one of (1) permanent magnets (PMs) and (2) side shields.

3. The apparatus of claim 2 wherein the cross-track anisotropy in the FL is introduced by generating anisotropic roughness on a sensor layer before depositing the FL.

4. The apparatus of claim 2 wherein the cross-track anisotropy in the FL is introduced by at least one of (1) magnetostriction and (2) oblique deposition of at least part of the FL.

5. The apparatus of claim 1, wherein a torque exerted on the magnetic moment of the FL by the cross-track anisotropy field increases linearity of transfer curve between the amplitude of output signal V and the media field compared the transfer curve resulting from torque exerted on the magnetic moment of the FL by a magnetostatic bias of the FL coming from PMs.

6. The apparatus of claim 1, wherein a torque exerted on the magnetic moment of the FL by the cross-track anisotropy field is substantially equal to $-0.5$ MHk $\sin(2\theta)$, wherein MHk is the substantially maximum torque generated by the cross-track anisotropy field and $\theta$ is the angle between the magnetic moment of the FL and a direction parallel to the air-bearing surface (ABS) of the apparatus.

7. The apparatus of claim 1, wherein the cross-track anisotropy field is substantially uniform in the FL along the cross-track direction.

8. An apparatus comprising:
a read sensor stack; and
a plurality of permanent magnets (PMs) located around the read sensor stack in a cross-track direction;
wherein a free layer (FL) of the read sensor stack includes a cross-track, uniaxial and bidirectional anisotropic layer.

9. The apparatus of claim 8 wherein the PMs generate a magnetostatic bias in the FL.

10. The apparatus of claim 8, wherein the cross-track anisotropy of the cross-track anisotropic layer is substantially uniform across the FL in cross-track direction.

11. The apparatus of claim 8 wherein the cross-track anisotropy generates a cross-track anisotropy field that partially replaces a magnetostatic bias of the FL from the PMs.

12. The apparatus of claim 8, wherein the cross-track anisotropy in the FL is introduced by generating anisotropic roughness on a layer of the read sensor stack before depositing the FL.

13. The apparatus of claim 8, wherein a torque exerted on the magnetic moment of the FL by the cross-track anisotropy field is substantially equal to $-0.5$ MHk $\sin(2\theta)$, wherein MHk is the substantially maximum torque generated by the cross-track anisotropy field and $\theta$ is the angle between the magnetic moment of the FL and a direction parallel to the air-bearing surface (ABS) of the apparatus.

14. The apparatus of claim 8, wherein the MT10/MT50 value of the apparatus is substantially below 1.51.

15. The apparatus of claim 8, wherein the MT10/MT50 value of the apparatus is substantially below 1.51.

16. A data storage system comprising:
a sensor stack of a read sensor having a free layer (FL) with cross-track, uniaxial and bidirectional, easy axis anisotropy; and a magnetic media, wherein a magnetic field of the magnetic media exerts a torque to a magnetic moment of the FL in a direction orthogonal to an air bearing surface (ABS) of the sensor stack.

17. The data storage system of claim 16, wherein the cross-track anisotropy generates a cross-track anisotropy field that partially replaces magnetostatic bias of the FL from at least one of (1) permanent magnets (PMs) and (2) side shields located next to the sensor stack in a cross-track direction.

18. The data storage system of claim 17 wherein a torque exerted on the magnetic moment of the FL by the cross-track anisotropy field is more linear at low $\theta$ than a torque exerted on the magnetic moment of the FL by a magnetostatic bias of the FL coming from PMs, wherein $\theta$ is the angle between a magnetic moment of the FL and a direction parallel to the ABS.

19. The data storage system of claim 16 wherein the cross-track anisotropy generates a cross-track anisotropy field that is orthogonal to the torque exerted by the magnetic media.

20. The data storage system of claim 16 wherein the cross-track anisotropy in the FL is introduced by oblique deposition of at least part of the FL.

* * * * *